United States Patent
Atkins et al.

(10) Patent No.: US 8,862,986 B2
(45) Date of Patent: Oct. 14, 2014

(54) ARRANGING GRAPHIC OBJECTS ON A PAGE WITH RELATIVE POSITION BASED CONTROL

(75) Inventors: C. Brian Atkins, Mountain View, CA (US); Gary L. Vondran, San Carlos, CA (US); Xiaofan Lin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2143 days.

(21) Appl. No.: 11/865,112

(22) Filed: Oct. 1, 2007

(65) Prior Publication Data
US 2009/0089660 A1   Apr. 2, 2009

(51) Int. Cl.
*G06F 17/00* (2006.01)
*G06Q 50/10* (2012.01)
*G06F 17/21* (2006.01)
*G06F 9/44* (2006.01)

(52) U.S. Cl.
CPC .............. *G06Q 50/10* (2013.01); *G06F 17/212* (2013.01); *G06F 9/4443* (2013.01)
USPC ........................................................ 715/243

(58) Field of Classification Search
CPC .................................................. G06F 17/212
USPC ........................................................ 715/243
See application file for complete search history.

(56) References Cited

U.S. PATENT DOCUMENTS

| | | | |
|---|---|---|---|
| 5,136,686 A | 8/1992 | Kozar | |
| 5,555,362 A | 9/1996 | Yamashita et al. | |
| 6,301,586 B1 | 10/2001 | Yang et al. | |
| 6,415,306 B2 | 7/2002 | Seaman | |
| 6,636,648 B2 | 10/2003 | Loui et al. | |
| 6,636,650 B1 | 10/2003 | Long et al. | |
| 6,701,306 B1 | 3/2004 | Kronmiller et al. | |
| 6,771,801 B1 | 8/2004 | Fisher et al. | |
| 7,093,263 B1 | 8/2006 | Sexton et al. | |
| 7,096,445 B1 | 8/2006 | Pucci et al. | |
| 7,148,990 B2 | 12/2006 | Atkins et al. | |
| 2002/0051208 A1 | 5/2002 | Venable | |
| 2002/0070982 A1 | 6/2002 | Hill et al. | |

(Continued)

FOREIGN PATENT DOCUMENTS

| JP | 1996-107495 | 4/1996 |
|---|---|---|
| JP | 1999-154239 | 6/1999 |

(Continued)

OTHER PUBLICATIONS

Winn, et al., "The Layout Consistent Random Field for Recognizing and Segmenting Partially Occluded Object", Proceedings of the 2006 IEEE Computer Society Conference on Computer Vision and Pattern Recognition, copyright 2006, IEEE, p. 1-8.*

(Continued)

*Primary Examiner* — Amelia Tapp

(57) ABSTRACT

A user-specified layout of graphic objects is received. A relative layout specification is derived from the user-specified layout. The relative layout specification describes relative positions of the graphic objects. A final layout of the graphic objects is determined in accordance with the relative layout specification. The final layout includes a specification of size dimensions and positions of the graphic objects on a page. The final layout of graphic objects is output.

16 Claims, 12 Drawing Sheets

(56) References Cited

U.S. PATENT DOCUMENTS

| | | |
|---|---|---|
| 2002/0122067 A1 | 9/2002 | Geigel et al. |
| 2003/0001879 A1 | 1/2003 | Lin et al. |
| 2005/0071364 A1* | 3/2005 | Xie et al. ............ 707/102 |
| 2005/0071781 A1 | 3/2005 | Atkins |
| 2005/0071783 A1* | 3/2005 | Atkins ............ 715/851 |
| 2005/0220345 A1* | 10/2005 | Chiu et al. ............ 382/190 |
| 2005/0240865 A1 | 10/2005 | Atkins et al. |
| 2005/0264571 A1 | 12/2005 | Stamm et al. |
| 2006/0001681 A1 | 1/2006 | Smith |
| 2006/0200758 A1 | 9/2006 | Atkins |
| 2006/0279566 A1 | 12/2006 | Atkins |
| 2007/0118797 A1* | 5/2007 | Layzell ............ 715/517 |

FOREIGN PATENT DOCUMENTS

| | | |
|---|---|---|
| JP | 2003-531428 | 10/2003 |
| JP | 2006-018811 | 1/2006 |
| JP | 2006-018842 | 1/2006 |
| JP | 2007-242021 | 9/2007 |
| KR | 100707645 B1 | 4/2007 |

OTHER PUBLICATIONS

D.F. Wong et al., "A new algorithm for floorplan design," Proc. Design Automation Conference, pp. 101-107, 1986.

"A method for creating a visually appealing layout of images for a collage," Research Disclosure Journal, Publication No. 512060, p. 1621 (Dec. 2006).

C. Brian Atkins, "Adaptive Photo Collection Page Layout," Int'l Conf on Image Processing (ICIP '04), vol. 5, pp. 2897-2900 (2004).

Eldan Goldenberg, "Automatic layout of variable-content print data," MCs Dissertation, School of Cognitive & Computing Sciences, Univeristy of Sussex, Brighton, UK, pp. 1-41 (2002).

Joe Geigel and Alexander Loui, "Automatic Album Page Layout Using Genetic Algorithms for Electronic Albuming", Working Paper, Research and Development, Eastman Kodak Company, pp. 1-12 (2001).

* cited by examiner

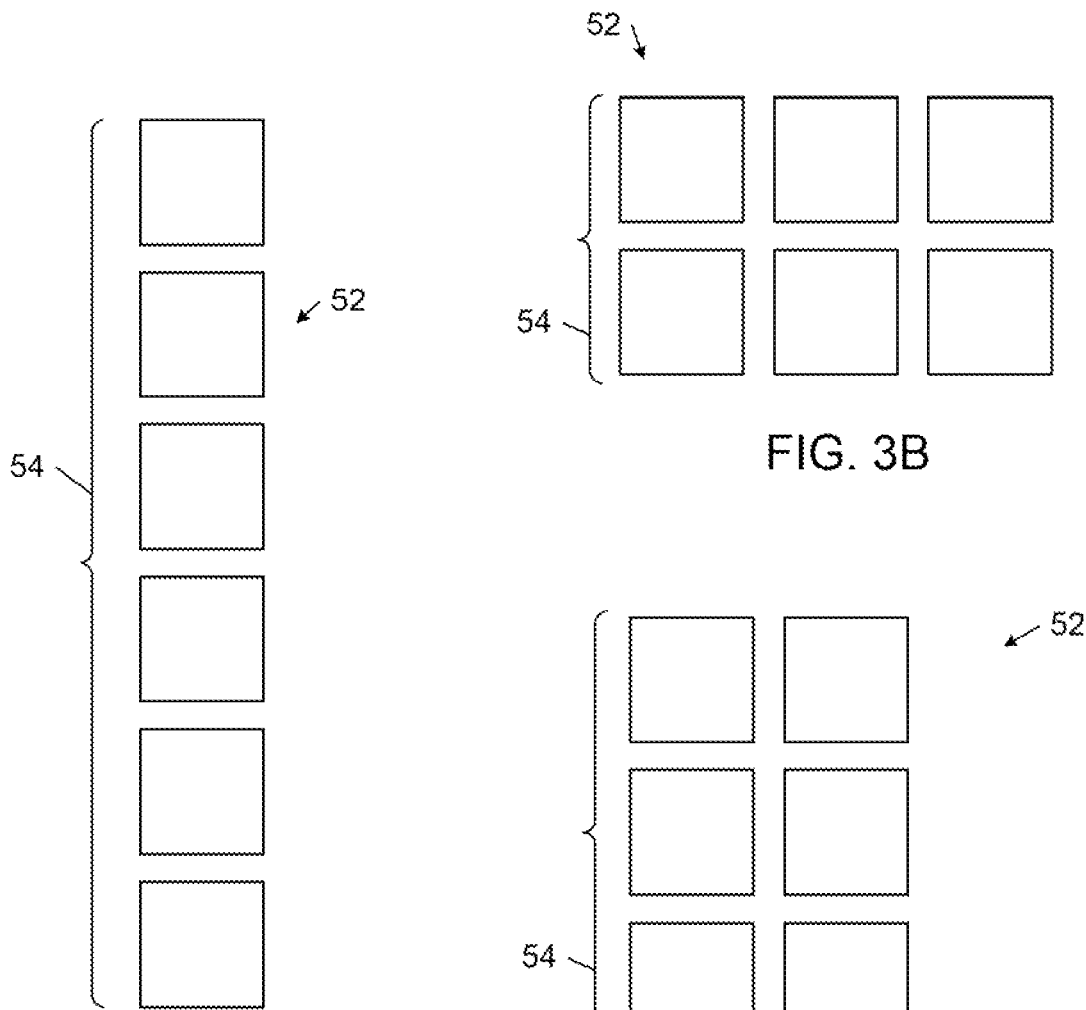
FIG. 3A
FIG. 3B
FIG. 3C
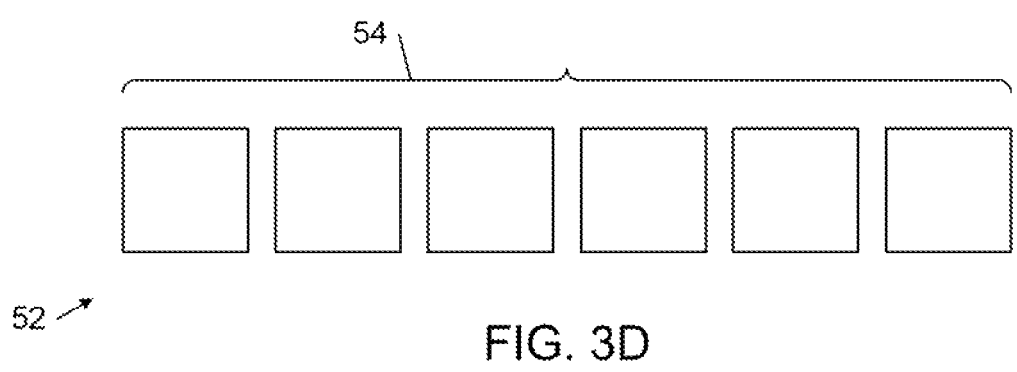
FIG. 3D

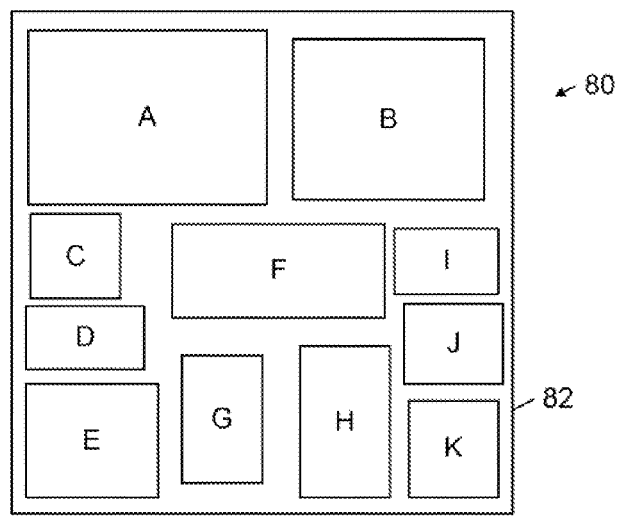
FIG. 6
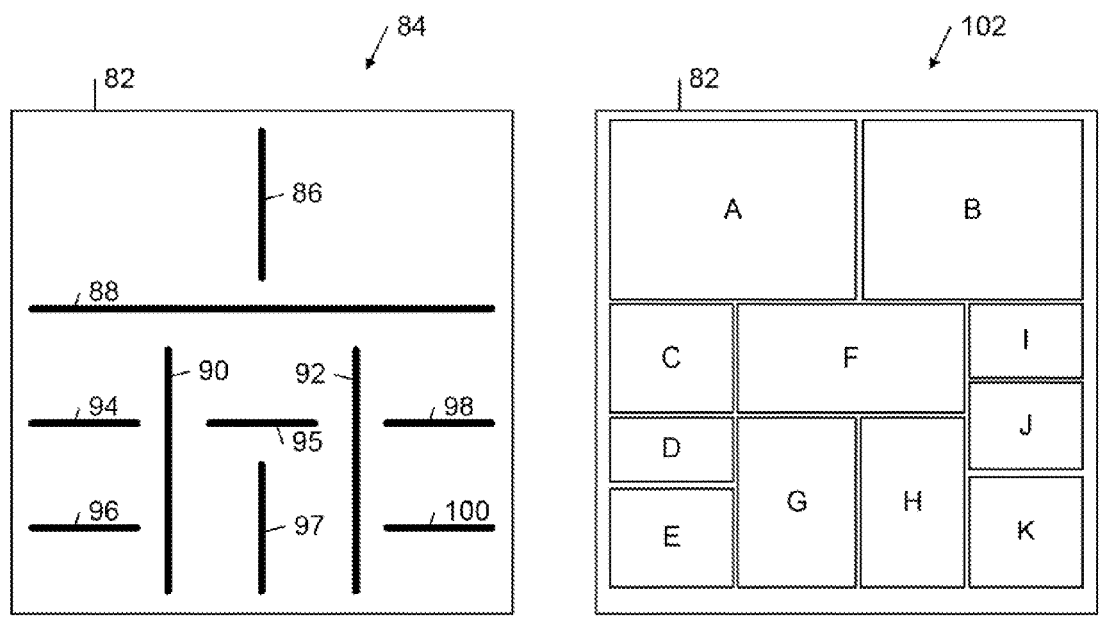
FIG. 7
FIG. 8

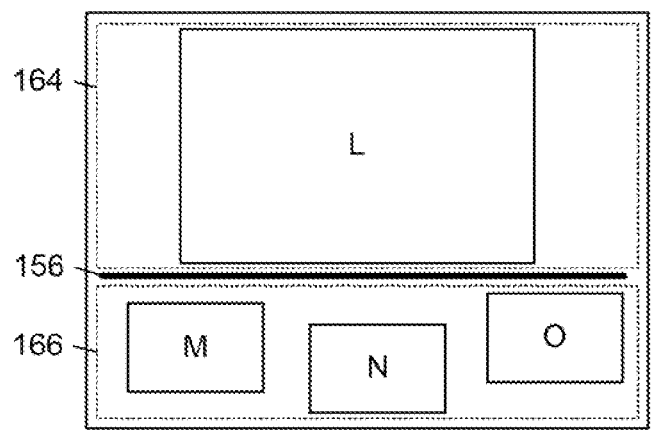
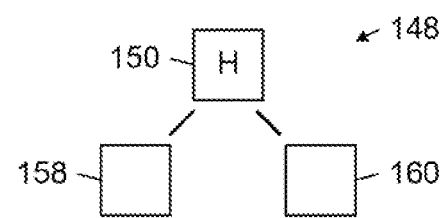
FIG. 14A  FIG. 14B
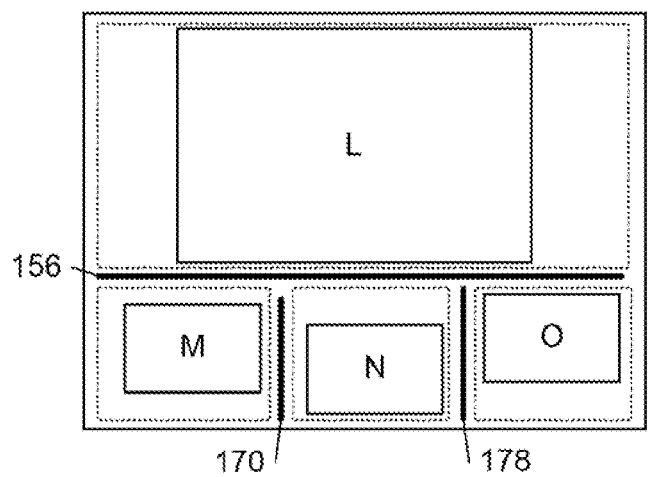
FIG. 15A
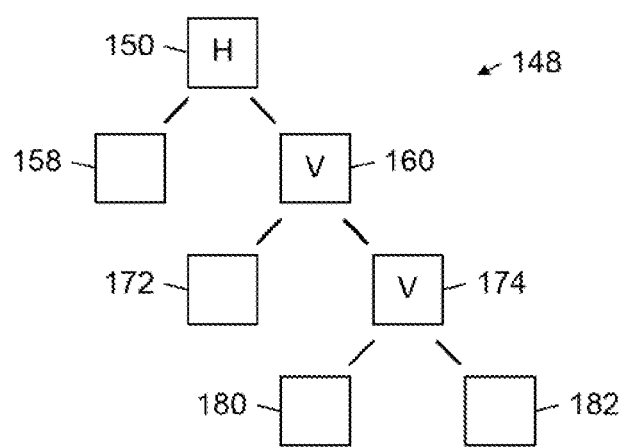
FIG. 15B

ARRANGING GRAPHIC OBJECTS ON A PAGE WITH RELATIVE POSITION BASED CONTROL

CROSS-REFERENCE TO RELATED APPLICATIONS

This application also relates to the following co-pending applications, each of which is incorporated herein by reference:

U.S. patent application Ser. No. 10/675,724, filed Sep. 30, 2003;
U.S. patent application Ser. No. 10/675,823, filed Sep. 30, 2003;
U.S. patent application Ser. No. 11/127,326, filed May 12, 2005;
U.S. patent application Ser. No. 11/128,543, filed May 12, 2005;
U.S. patent application Ser. No. 10/831,436, filed Apr. 23, 2004;
U.S. patent application Ser. No. 11/126,637, filed Apr. 15, 2005;
U.S. patent application Ser. No. 11/151,167, filed Jun. 10, 2005;
U.S. patent application Ser. No. 11/069,512, filed Mar. 1, 2005;
U.S. patent application Ser. No. 10/987,288, filed Nov. 12, 2004;
U.S. patent application Ser. No. 11/364,933, filed Mar. 1, 2006; and
U.S. patent application Ser. No. 11/769,671, filed Jun. 27, 2007.

BACKGROUND

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several manual digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Some automated digital image albuming systems allow users to organize digital images into album pages in accordance with dates and times specified in the metadata associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template.

Some digital image albuming systems are designed to produce album pages automatically with minimal input from the user. One such system includes a page creator module and an image placement module. The page creator module assigns images in a collection to album pages based on a first genetic evolution algorithm. The image placement module generates genetic structures of page layouts for images that are assigned to a given page based on a second genetic evolution algorithm. These genetic structures define the locations, scales, and rotational orientations of the images that are placed on a given page. A page layout generator module compares these layouts with certain other preferences and page requirements. When a suitable layout has been generated, the final album layout may be displayed, printed, or otherwise transferred for subsequent utilization.

Another automatic digital image albuming system includes a page layout module that presents to a user an album that is organized by event and is laid out automatically based on a set of albuming parameters. The number of images that are laid out on a page is determined by a parametric method or by an analysis of the attributes of the images. The parametric method divides a page into a set of grid squares and determines the number of images to be laid out on the page based on a set of rules for laying out images on the grid squares. In this system, the actual layout of images on a page also may be determined by matching attributes of the images, such as their sizes, to a set of templates.

Another automatic digital image albuming system automatically positions images on a page based on a force model that assumes that each image imposes a force on other images located on the same page. The force is a function of the distance separating the images. The system modifies an initial layout of images on the page by moving each image in a direction of the net force acting on the image by a distance that is a function of the net force.

What are needed are systems and methods of automatically arranging graphic objects on a page that are capable of being guided or controlled by explicit preferences for the relative positions of one or more of the graphic objects in each layout.

SUMMARY

In one aspect, the invention features a method in accordance with which a user-specified layout of graphic objects is received. A relative layout specification is derived from the user-specified layout. The relative layout specification describes relative positions of the graphic objects. A final layout of the graphic objects is determined in accordance with the relative layout specification. The final layout includes a specification of size dimensions and positions of the graphic objects on a page. The final layout of graphic objects is output.

The invention also features apparatus operable to implement the method described above and computer-readable media storing computer-readable instructions causing a computer to implement the method described above.

Other features and advantages of the invention will become apparent from the following description, including the drawings and the claims.

DESCRIPTION OF DRAWINGS

FIG. 3A-3D are diagrammatic views of four presentations of a multi-element graphic object formed from six constituent graphic objects.

FIG. 6 is a diagrammatic view of an exemplary user-specified layout of graphic objects.

FIG. 7 is a diagrammatic view of an exemplary relative layout specification derived from the user-specified layout shown in FIG. 6.

FIG. 8 is a diagrammatic view of an exemplary final layout of graphic objects that is determined by the system of claim 4 in accordance with the relative layout specification shown in FIG. 7.

FIG. 14A shows an exemplary partition between graphic objects in the user-specified layout of FIG. 13A.

FIG. 14B is a diagrammatic view of a binary tree structure representing the user-specified layout partitioning shown in FIG. 14A.

FIG. 15A shows exemplary partitions between graphic objects in the user-specified layout of FIG. 13A.

FIG. 15B is a diagrammatic view of a binary tree structure representing the user-specified layout partitioning shown in FIG. 15A.

DETAILED DESCRIPTION

Figure 1:
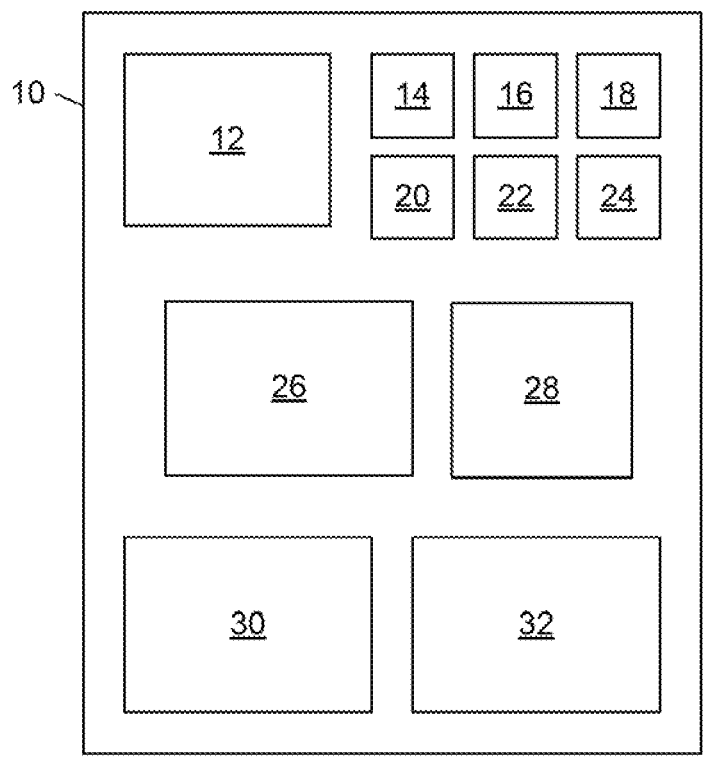
FIG. 1 is a diagrammatic view of a layout of graphic objects on a page.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. INTRODUCTION

The embodiments that are described in detail herein provide ways to arrange graphic objects on one or more pages. These embodiments are capable of being guided or controlled by explicit preferences for the relative positions of the graphic objects in each layout (or arrangement). At the same time, these embodiments are capable of automatically generating from these preferences a final layout of the graphic objects that conforms to specified design constraints (e.g., page dimensions, margins, and gutter spacing constraints). In this way, users are able to guide these embodiments to a particular layout of the graphic objects that meets the general graphic object arrangement preferences of the user, while presenting a cleaner, more professional and more aesthetically pleasing appearance.

As used herein, the term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

The term "graphic object" refers broadly to any type of visually perceptible content that may be rendered on a physical or virtual page, including images and text. Image-based graphic objects (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. The term "graphic object" encompasses both a single-element graphic object and a multi-element graphic object formed from a cohesive group or collection of one or more graphic objects. The assignment of single-element graphic objects to a particular multi-element graphic object signifies that the constituent single-element graphic objects are related. In general, the type of single-element graphic objects in a multi-element graphic object may be the same or different. The graphic objects typically are stored in one or more databases on one or more computer-readable media.

In some implementations, image-based graphic objects (e.g., images, such as photographs) may be designated as fixed-area images or variable-area images. In these implementations, the areas or sizes of the fixed area images are not changed in the generated layouts, whereas the sizes of the variable-area images are permitted to change. Variable-area images may or may not have constraints associated with the relative areas of images rendered on the same page.

In the illustrated embodiments, each of the image-based graphic objects has a respective aspect ratio. The aspect ratio is defined as the ratio of image height to image width. Each variable-area image may be assigned a respective positive scalar-valued nominal size. The term "nominal size" refers to a designated or theoretical size that may or may not vary from the actual or rendered size. The "size" of a graphic object refers to the amount of area of a page that is occupied by the graphic object. In some embodiments, the user is allowed to set the nominal size values that are assigned to the images. In other embodiments, the graphic object arrangement system automatically assigns the nominal size values to the graphic objects.

FIG. 1 shows an exemplary page 10 that includes multiple single-element graphic objects 12-32.

Figure 2:
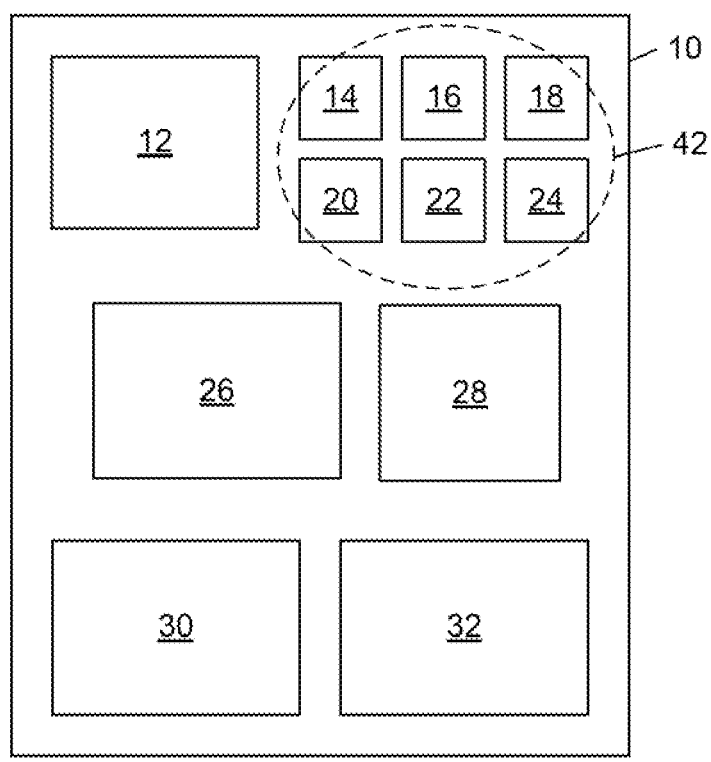
FIG. 2 is a diagrammatic view of the graphic object layout shown in FIG. 1 in which a multi-element graphic object that is formed from constituent single-element graphic objects is identified by a dashed ellipse.

As shown in FIG. 2, selected ones of the single-element graphic objects 12-32 may be grouped into a graphic object 42 whose constituent graphic objects (i.e., 14-24) are intended to appear near one another in a layout of the graphic objects on a page. In the example shown in FIG. 2, the multi-element graphic object 42 may include different types of single-element graphic objects (e.g., image-based graphic objects and textual graphic objects). In addition, the single-element graphic objects of a multi-element graphic object may be arranged arbitrarily or in a specific ordered sequence (e.g., a temporally ordered sequence of keyframes of a video clip). A single-element graphic object that does not have a cohesive relationship with any other graphic object is a "degenerate" graphic object that has only one presentation.

As shown in FIGS. 3A-3D, a graphic object 52 having more than one constituent graphic object may be presented (or arranged) in more than one way. In some implementations, the presentations of single-element graphic objects in a multi-element graphic object are limited to horizontal and vertical arrangements of the graphic objects. In some of these implementations, the presentations may be further limited to certain preferred horizontal and vertical arrangements of the single-element graphic objects. For example, one implementation only permits presentations in which textual graphic objects appear only to the right of or below the images in the same multi-element graphic object. In this case, a graphic object that includes an image and a text block may be presented in two different ways. FIGS. 3A-3D show that the graphic object 52, which includes a sequence 54 of six graphic objects (e.g., video keyframes), may be presented in four different ways.

In general, graphic objects may be laid out on a page in accordance with a "strict area" style or a "brick" style. In a strict area style layout, the relative areas of graphic objects on the same page may meet pre-specified proportions. For example, a user may specify that all graphic objects on the same page have the same area. In a brick style layout, the relative areas of graphic objects on the same page are selected so that there is no empty space between images. Additional details regarding strict area style layouts and brick style layouts may be obtained from U.S. patent application Ser. No. 10/675,724, filed Sep. 30, 2004, and U.S. patent application Ser. No. 10/675,823, filed Sep. 30, 2004.

II. GENERAL FRAMEWORK FOR ARRANGING GRAPHIC OBJECTS ON PAGES

Figure 4:
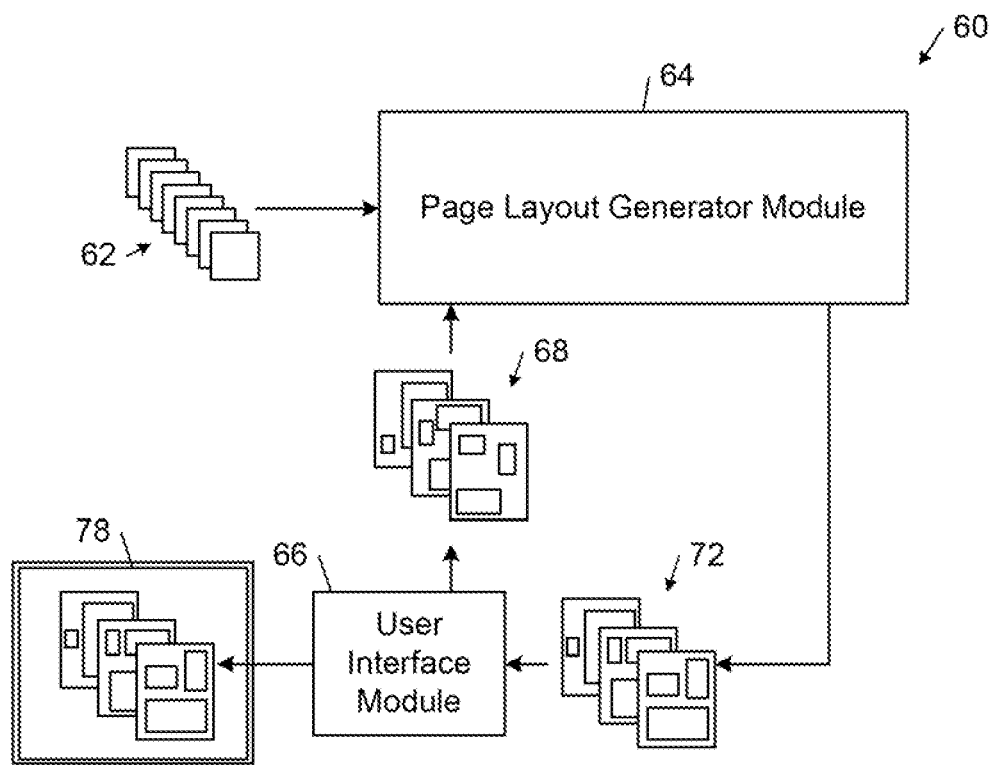
FIG. 4 is a block diagram of an embodiment of a system for arranging graphic objects on one or more pages.

FIG. 4 shows an embodiment of a system 60 for arranging graphic objects 62 on one or more pages. The system 60 includes a page layout generator module 64 and a user interface module 66 through which a user interacts with the graphic object arrangement system 60. The graphic objects 62 may be stored in one or more local or remote image databases. The modules of the graphic object arrangement system 60 are not limited to a specific hardware or software configuration, but rather they may be implemented in any computing or processing environment, including in digital electronic circuitry or in computer hardware, firmware, device driver, or software.

Figure 5:
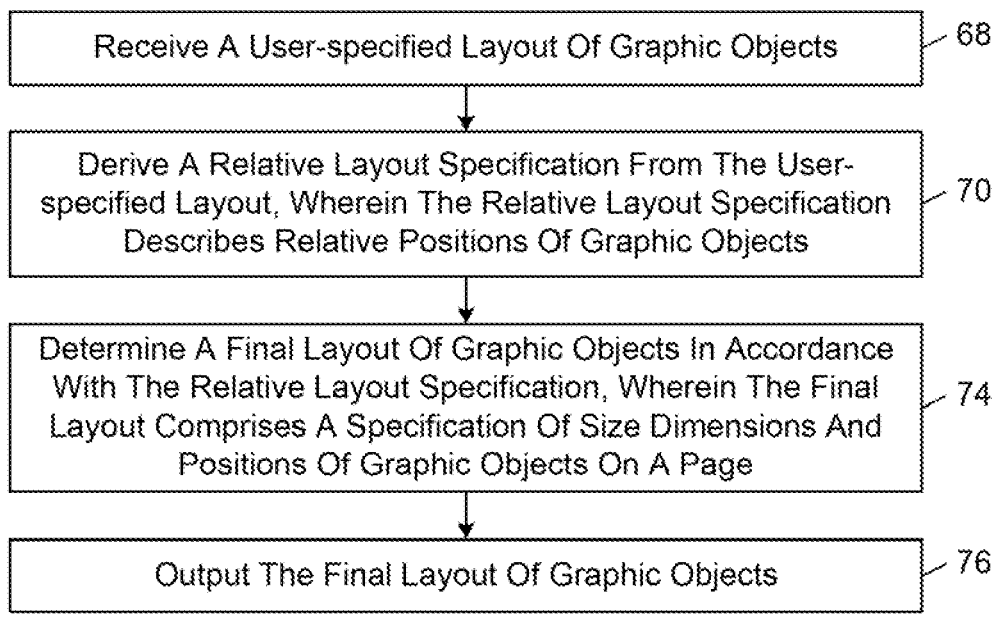
FIG. 5 is a flow diagram of an embodiment of a graphic object arrangement method that is implemented by the system of FIG. 4.

FIG. 5 shows an embodiment of a method by which the user interface module 66 and the page layout generator module 64 cooperatively generate a respective layout of ones of the graphic objects 62 on a page.

For each page, the user interface module 66 receives a respective user-specified layout 68 of ones of the graphic objects 62 (FIG. 5, block 68). As explained in detail below, in some embodiments, a user may produce the graphic object layouts, for example, by inputting commands to a graphics-based layout tool or by inputting a hand-drawn mock-up (i.e., a rough drawing or sketch) of the graphic object layouts and providing a mapping between graphic elements in the hand-drawn mock-up and respective ones of the graphic objects 62.

The page layout generator module 64 derives a relative layout specification from the user-specified layout (FIG. 5, block 70). As used herein, the term "relative layout" refers to a layout of graphic objects on a page in which the relative positions of the graphic objects are specified but the absolute positions of the graphic objects are not specified. The relative layout specification describes relative positions of the graphic objects. The relative layout specification may correspond to any type of floor plan model that describes the relative positions of the graphic objects. The relative layout specification may describe the relative positions of the graphic objects in relation to each other or in relation to a common reference point (e.g., a corner point or an edge point on a page).

The page layout generator module 64 determines a final layout 72 of the graphic objects on each page in accordance with the respective relative layout specification (FIG. 5, block 74). Each of the final layouts 72 includes a specification of size dimensions and positions of the graphic objects on a page. As used herein, the terms "determinate layout" and "final layout" are used synonymously to refer to a layout of graphic objects on a page in which the positions and dimensions of the graphic objects are specified. In some embodiments, the page layout generator module 64 determines for each of the pages a respective final layout of the graphic objects that preserves the relative positions of the graphic objects in the user-specified layout but improves the aesthetic appearance of the layout by modifying the sizes and positions of the graphic objects to conform to specified design constraints (e.g., page dimensions, margins, and gutter spacing constraints).

The page layout generator module 64 outputs the final layout of graphic objects 72 (FIG. 5, block 76). In some implementations, the page layout generator module 64 outputs the final layouts 72 in the form of a specification that is arranged in a particular file format (e.g., PDF or XML). The page layout generator module 64 outputs the final layouts 72 of the graphic objects 62 to the user interface module 66, which presents (or renders) the final layouts 72 on a display 78. In some implementations, the user interface module 66 allows a user to interactively browse the pages that are generated automatically by the graphic object arrangement system 60. The user interface module 66 also allows a user to specify edits to the pages. Any specified edits to a given page are interpreted by the user interface module 66. The user interface module 66 transmits the interpreted user command instructions to the page layout generator module 64. The page layout generator module 64 may repeat one or more aspects of the method of FIG. 5 to determine revised final layouts 72 of one or more pages in accordance with the edits received from the user interface module 66. For example, the user might adjust the sketch and re-submit it. Or the user might crop an image and have the page layout generator module reformat the page with the cropped image. The user interface module 66 presents the revised final layouts 72 to the user. The user then may browse the revised pages, specify edits to the one or more revised pages, or command the system 60 to render some or all of the pages.

FIG. 6 shows an exemplary user-specified layout 80 of graphic objects (A-K). The graphic object layout 80 shows the relative positions of the graphic objects A-K, both in terms of their positions in relation to one another and in terms of their positions in relation to features of a page 82 on which the graphic objects are laid out.

FIG. 7 shows an exemplary relative layout specification 84 that is derivable from the user-specified layout 80. The relative layout specification 84 describes partitions 86-100 (also referred to as divisions) between adjacent ones of the graphic objects A-K. The partitions 86-100 divide the page 82 into cells, where each of the cells contains exactly one of the graphic objects A-K.

FIG. 8 shows an exemplary final layout 102 of the graphic objects A-K that was determined by the page layout generator module 64 in accordance with the relative layout specification 84 (see FIG. 7). The exemplary final layout 102 shown in FIG. 7 corresponds to a brick style layout, in which the relative areas of graphic objects A-K on the page 82 were selected so that there is no empty space between images other than specified margin spacings between the edges of the page 82 and the graphic objects A-K and specified gutter spacings between adjacent ones of the graphic objects.

III. ARRANGING GRAPHIC OBJECTS ON A PAGE WITH RELATIVE POSITION BASED CONTROL

A. Introduction

The page layout generator module 64 is capable of being guided or controlled by explicit preferences for the relative positions or areas of the graphic objects in each page layout. This feature enables a user to input preferences for the relative positions of the graphic objects, where the relative position preferences or areas cause the page layout generator module 64 to produce a particular layout of the graphic objects that meets the general graphic object arrangement preferences of the user, while presenting a cleaner, more professional and more aesthetically pleasing appearance.

As explained in detail below, the page layout generator module 64 receives a user-specified layout of graphic objects, derives a relative layout specification from the user-specified layout, and determines a final layout of the graphic objects in accordance with the relative layout specification.

B. Receiving a User-Specified Layout of Graphic Objects

In general, the page layout generator module 64 may receive the user-specified layout of graphic objects in a variety of different ways. For example, a user may produce the graphic object layout by using a graphics-based layout tool. Alternatively, a user may input an image of a hand-drawn mock-up (i.e., a rough drawing or sketch) of the graphic object layout and a mapping (e.g., an index or other reference) that links the graphic elements in the hand-drawn mock-up to respective digital files of the graphic objects that are to be laid out on the page.

Figure 9:
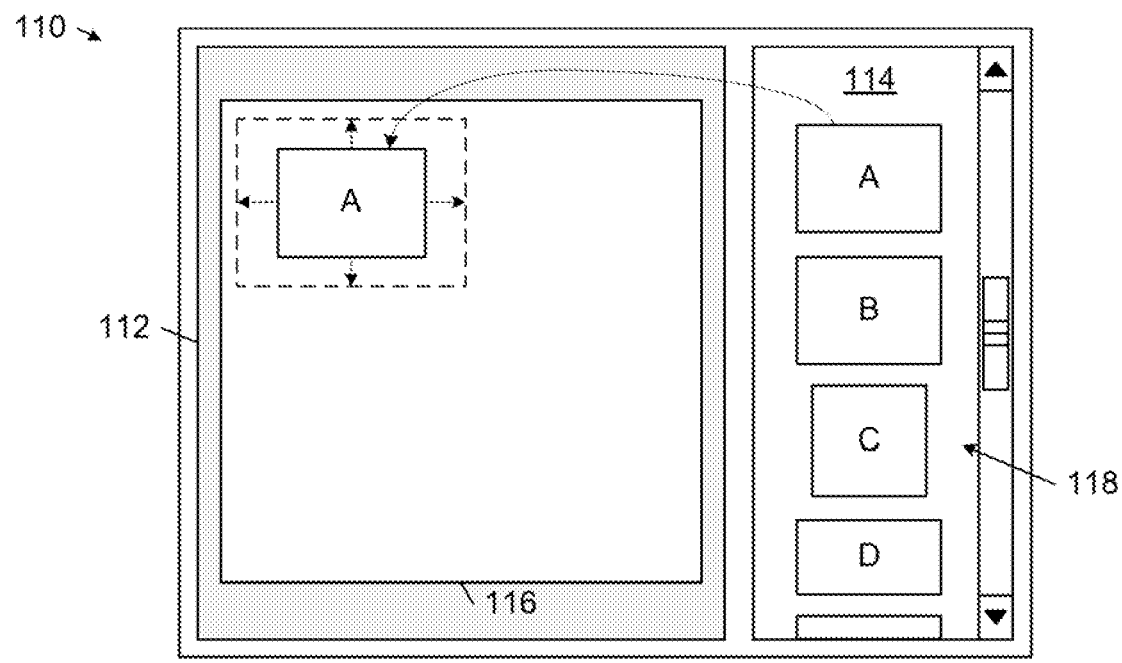
FIGS. 9 and 10 show an embodiment of a graphical user interface that receives user commands for constructing a user-specified layout of graphic objects.

1. Graphical User Interface for Constructing a User-Specified Layout of Graphic Objects FIG. 9 shows an embodiment of a user interface 110 that enables a user to construct a user-specified layout by inputting commands for arranging representations of selected graphic objects on a page. The graphical user interface 110 typically is generated by a layout tool that is implemented by a software application program that provides various graphics-based functions (e.g., the functions that typically are provided by a software application program, such as Microsoft® Power-Point® and Microsoft® Visio® software application programs) that enable a user to control the sizes and positions of graphic elements on a page.

The user interface 110 includes a layout window 112 and a graphic object browsing window 114. The layout window 112 presents a page 116 on which the user can construct a user-specified graphic object layout. The graphic object browsing window 114 contains an array of reduced-resolution thumbnail versions 118 of available graphic objects that may be laid out on the page 116. Each of the graphic object thumbnails 118 is linked (e.g., by a pointer or other reference or index) to a respective file of a graphic object that is represented by the graphic object thumbnail.

Figure 10:
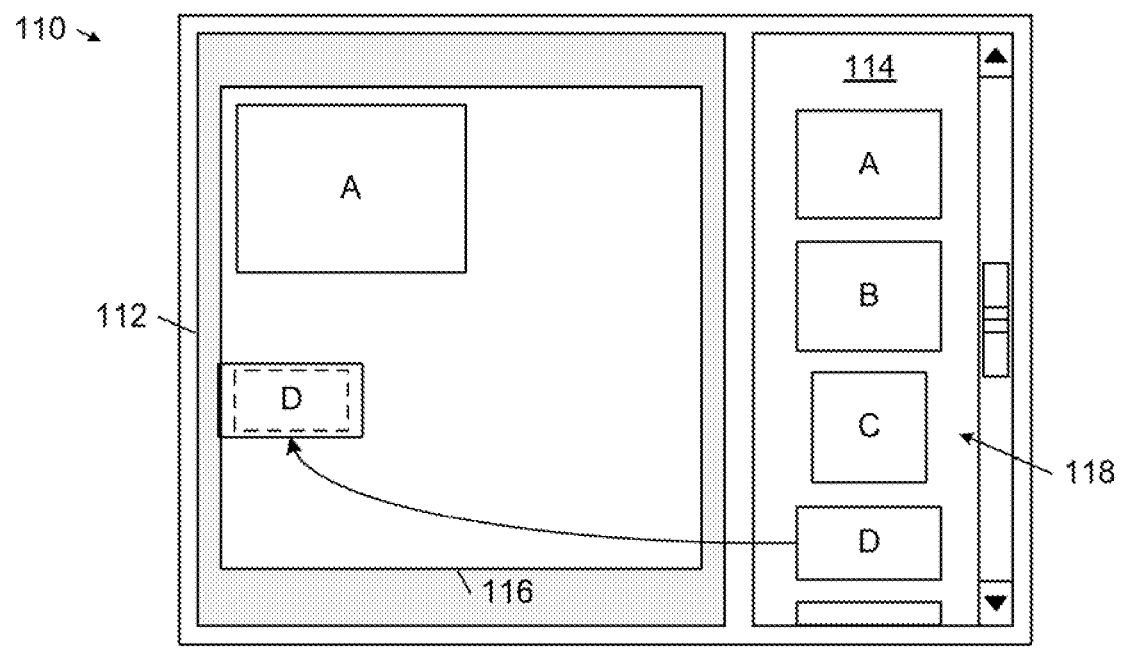

The user may drag ones of the graphic object thumbnails 118 from the graphic object browsing window 114 to desired locations on the page 116 in the layout window 112. As shown in FIG. 9, the user may drag the graphic object thumbnail A from the graphic object browsing window 114 to a location in the upper left corner of the page 116. After positioning the graphic object thumbnail on the page 116, the user may resize the graphic object thumbnail by selecting a point on an edge or a corner of the graphic object thumbnail and moving the selected point to a desired location on the page 116. For example, the user may increase the size of the graphic object thumbnail A on the page 116 by dragging each of the four edges of the graphic object thumbnail in outward directions, as shown diagrammatically by the dashed arrows in FIG. 9. FIG. 10 shows a layout that is produced after the user has dragged the graphic object thumbnail D to a position on the left side of the page 116 and reduced the graphic object thumbnail D to the size represented by the dashed rectangle.

As the user constructs the user-specified graphic object layout, the layout tool maintains a floor plan specification that records the locations and sizes of the graphic objects on the page 116. In some embodiments, the floor plan specification records the page coordinates of the upper left and lower right corners of the bounding boxes of the graphic object thumbnails that are laid out on the page 116. In addition, the floor plan specification records a mapping between the bounding boxes and the respective ones of the graphic object files that are linked to the graphic object thumbnails represented by the bounding boxes. As explained in detail below, the page layout generator module 64 produces a relative layout specification from the floor plan specification.

2. Receiving an Image of a User-Specified Layout of Graphic Objects

Figure 11:
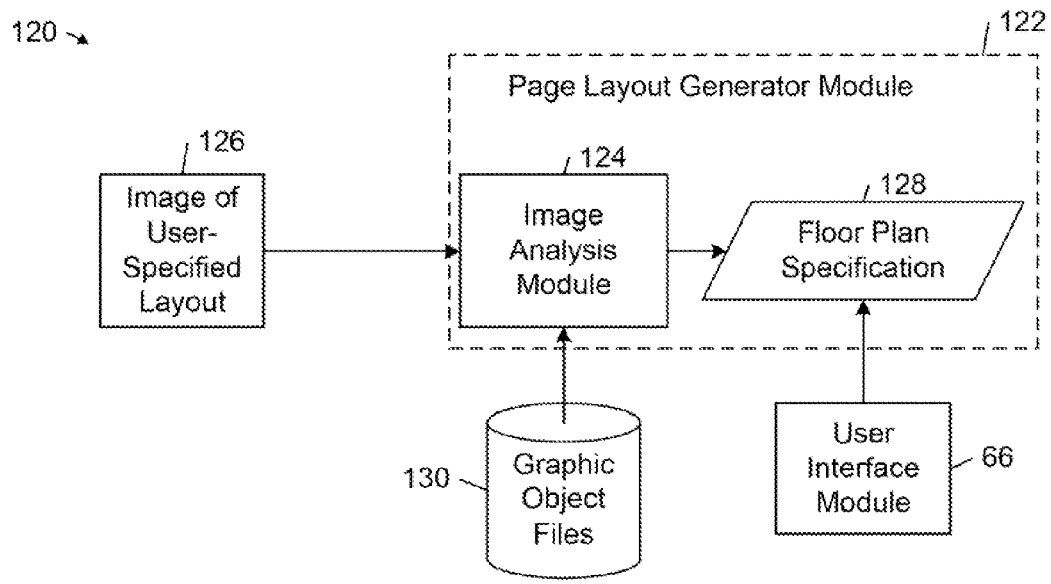
FIG. 11 is a block diagram of an embodiment of the graphic object arrangement system shown in FIG. 4.

FIG. 11 shows an embodiment 120 of the graphic object arrangement system 60 (see FIG. 4). The system 120 includes an embodiment 122 of the page layout generator module 64 that includes an image analysis module 124 that produces a floor plan specification 128 from an image 126 of a user-specified layout of graphic objects on a page. In this process, the image analysis module 124 determines the locations and sizes of the graphic objects in the image 126 and records that information in the floor plan specification 128. The image 126 of the user-specified layout typically corresponds to a hand-drawn sketch of a graphic object layout that is produced on a sheet of paper and is digitally scanned into an image file or that is produced on a touch sensitive pad, such as a touch screen display or a graphics tablet.

In some embodiments, the floor plan specification records the page coordinates of the upper left and lower right corners of the bounding boxes of the graphic objects that are laid out on the image 126. In addition, the floor plan specification records a mapping between the coordinates of the bounding boxes and the respective ones of the graphic object files that are linked to the graphic objects in the image 126 and are stored in a database 130.

In some embodiments, the image analysis module 124 determines the mapping by extracting graphic object identifiers from the image 126 and determining the graphic object files referenced by the extracted identifiers (e.g., by using the extracted identifiers as indices into the database 130). In other embodiments, the user may input the mapping between the graphic objects in the image 126 and respective ones of the image files stores in the database 130 via the graphical user interface 66.

Figure 12:
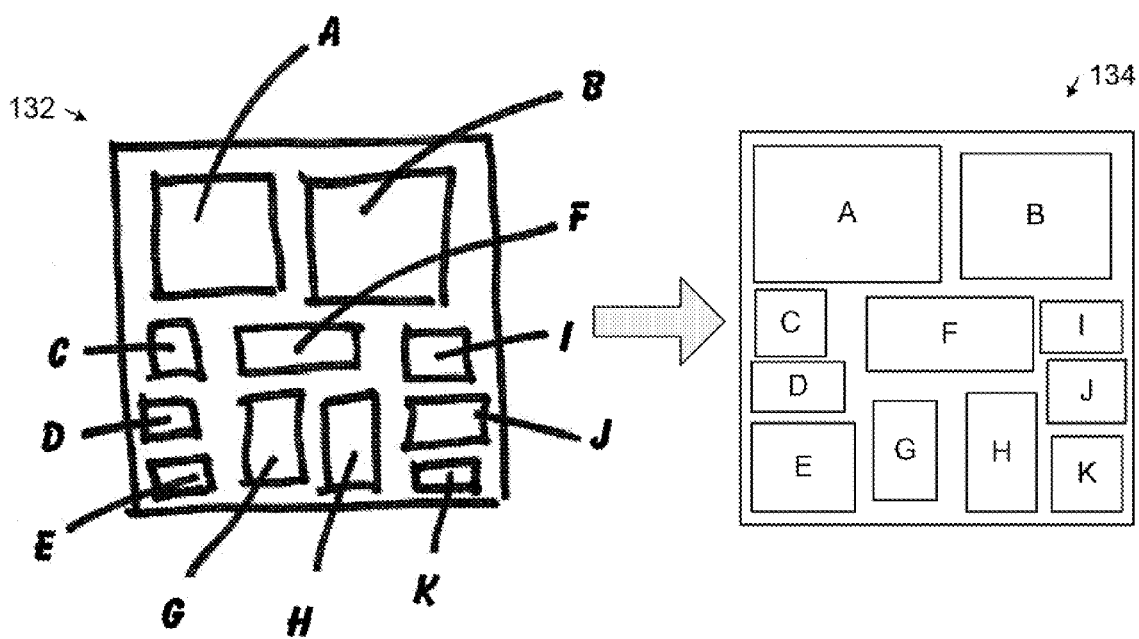
FIG. 12 shows an exemplary image of a user-specified layout of graphic objects and an exemplary machine-interpreted version of the user-specified layout.

FIG. 12 shows an exemplary image of a user-specified layout 132 of graphic objects and an exemplary graphical representation 134 of a floor plan specification that is derived by the image analysis module 124 from the user-specified layout 132. Each of the graphic objects in the user-specified layout 132 is labeled with a respective identifier (i.e., A-K). The image analysis module 124 extracts these identifiers to determine the correspondences between the graphic objects in the user-specified layout 132 and the respective ones of the graphic object files in the database 130. As explained in detail below, the page layout generator module 64 produces a relative layout specification from the floor plan specification.

3. Imposing Conditions of the User-Specified Layouts of Graphic Objects

In some embodiments, the page layout generator module 64 enforces on the user-specified graphic object layout certain conditions that improve the ability of the page layout generator module 64 to derive a relative layout specification from the user-specified layout. For example, in some of the embodiments described below, the page layout generator module 64 ascertains a relative layout specification based on horizontal and vertical projections across the user-specified layout. In some of these embodiments, the page layout generator module 64 imposes the following requirements on the user-specified graphic object layout:

Each of the graphic elements in the user-specified layout must fall completely inside the page;

Each of the graphic elements in the user-specified layout must not overlap any of the other graphic elements on the page; and The graphic elements in the user-specified layout must be arranged in such a way that the graphic elements in the user-specified layout can be separated from one another by partitions that are generated in a series of binary divisions of regions of the page, where each division is either a horizontal division or a vertical division that divides a rectangular region of the page 116 into two smaller rectangular regions.

In some embodiments, in response to a determination that the user-specified graphic object layout violates one of the above requirements, the system 60 issues an error message informing the user that the user-specified graphic object layout should be modified.

C. Deriving a Relative Layout Specification from the User-Specified Layout

The page layout generator module 64 may derive a relative layout specification from the user-specified layout in a variety of different ways. In this process, the page layout generator module 64 extracts from the user-specified layout a description of the relative positions of the graphic objects, either in relation to each other or in relation to a common reference point (e.g., a corner point or an edge point on a page). The relative layout specification typically describes a decomposition of the page into cells each of which contains exactly one of the graphic objects specified in the user-specified layout. In some embodiments, the floor plan model corresponds to a recursive partitioning (or subdividing) model, such as a binary space partitioning model, which can be organized into a tree structure.

The page layout generator module 64 typically derives the relative layout specification from a floor plan specification that stores a description of the user-specified graphic object layout. In some embodiments, the floor plan specification includes the page coordinates of the upper left and lower right corners of rectangular regions of a page that the user has designated for respective ones of the graphic objects 62. The page layout generator module 64 analyzes the positions of the rectangular regions to identify a sequence of partitions (or divisions) of the page that results in a set of cells that have a one-to-one relationship with the rectangular regions. These partitions typically are organized into a hierarchical tree structure that records the sequence of partitions from which the set of cells corresponding to the rectangular regions can be determined. In some embodiments, the page layout generator module 64 stores the relative layout specification in a respective binary tree data structure, which has leaf nodes corresponding to graphic objects and interior nodes corresponding to partitions of the corresponding page.

In some embodiments, the page layout generator module 64 ascertains a relative layout of the graphic objects from the user-specified layout by determining horizontal and vertical histogram profiles of the user-specified layout, and determining partitions that that separate the graphic objects from each other.

Figure 13A:
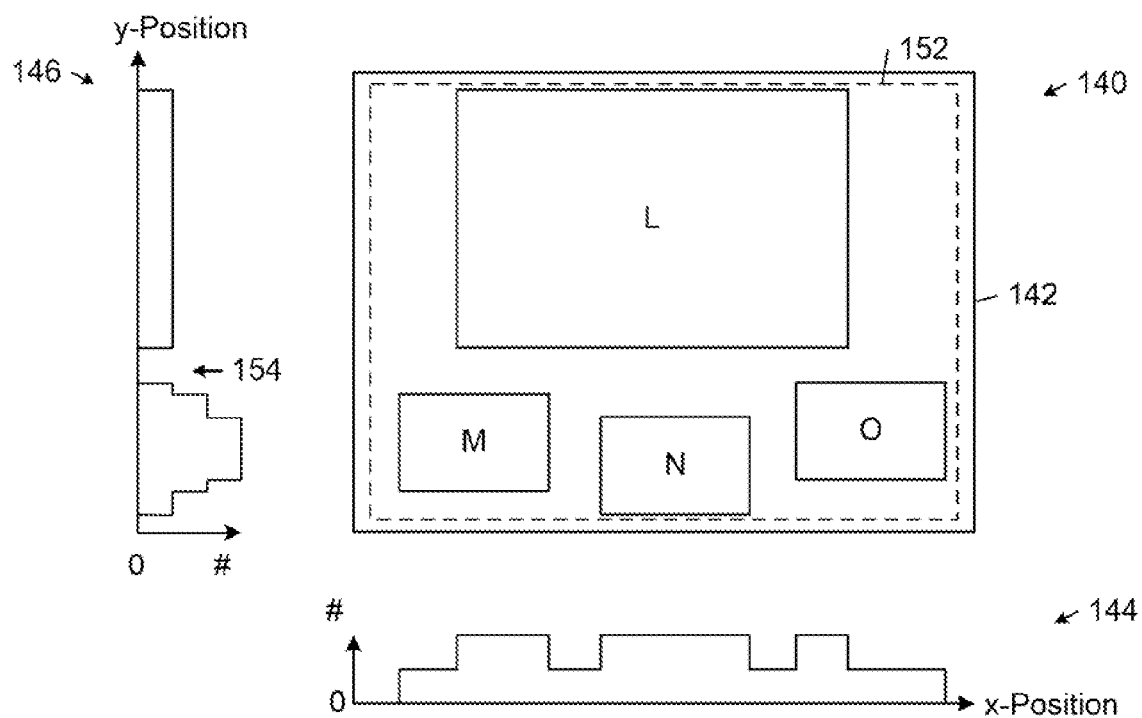
FIG. 13A is a diagrammatic view of an exemplary user-specified layout of graphic objects and histograms derived from horizontal and vertical projections of counts of the graphic objects as a function of position along horizontal (x) and vertical (y) axes.

In one illustrative example, FIG. 13A shows an exemplary user-specified layout 140 of graphic objects (i.e., graphic objects L, M, N, O) on a page 142. FIG. 13 also shows a horizontal histogram profile 144 and a vertical histogram profile 146. The horizontal histogram profile 144 is derived from a vertical projection of a count of the graphic objects L-O as a function of position along the horizontal axis (x). The vertical histogram profile 144 is derived from a horizontal projection of a count of the graphic objects L-O as a function of position along the vertical axis (y). In accordance with these embodiments, the page layout generator module 64 determines partitions that subdivide the page 142 based on local minima in the horizontal and vertical histograms 144, 146.

Figure 13B:
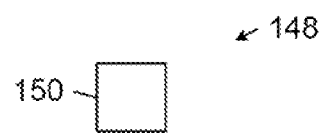
FIG. 13B is a diagrammatic view of a tree structure representing the user-specified layout shown in FIG. 13A.

In one exemplary embodiment, the page layout generator module 64 first creates an initial tree 148 with one node 150 that is associated with a bounding box 152 that encompasses the entire page 142, as shown in FIGS. 13A and 13B. The page layout generator module 64 identifies zero values in the histograms 144, 146, selects one of the identified zero values, and subdivides the current node 150 into two nodes using a partition at the location of the selected zero value. In the example shown in FIG. 13A, there is a single zero value 154 in the histograms 144, 146. The page layout generator module 64 generates a horizontal partition 156 at the location of the zero value 154 (see FIG. 14A). The horizontal partition 156 (H) subdivides the node 150 into two nodes 158, 160, which are associated with bounding boxes 166, 164, as shown in FIGS. 14A and 14B.

If a node is associated with a bounding box that has only one graphic object, that node is not subdivided again. For example, at the stage of the partitioning process shown in FIGS. 14A and 14B, the node 158 is associated with the bounding box 164 and therefore is not subdivided again. If a node is associated with a bounding box that contains more than one graphic object, it is designated as the current node and the process is repeated. At the stage of the partitioning process shown in FIGS. 14A and 14B, the node 160 is associated with the bounding box 166, which contains three graphic objects M-O. Therefore, at the conclusion of this stage, the node 160 is labeled the current node and the process is repeated.

In one exemplary instance of the process of repeating the partitioning process for the node 160, the page layout generator module 64 determines horizontal and vertical histograms of the graphic objects in the bounding box 166, which is associated with the current node 160. The page layout generator module 64 selects a first one of the two zeros in the horizontal histogram and partitions the current node 160 with a vertical partition 170 that subdivides the current node 160 into two nodes 172, 174 (see FIG. 15A). Next, the page layout generator module 64 determines horizontal and vertical histograms of the graphic objects in a bounding box that contains graphic objects N and O and is associated with the current node 174 (see FIG. 15B). The page layout generator module 64 selects the only zero in the horizontal histogram and partitions the current node 174 with a vertical partition 178 that subdivides the current node 174 into two nodes 180, 182 (see FIG. 15B). In the exemplary tree structure shown in FIG. 15B, the interior nodes 150, 160, 174 correspond to the partitions 156, 170, 178, respectively, whereas the leaf nodes 158, 172, 180, 182 correspond to the graphic objects L, M, N, O, respectively.

D. Determining a Final Layout of the Graphic Objects in Accordance with the Relative Layout Specification 1. Overview The page layout generator module 64 generates final or determinate arrangements of graphic objects on the pages from the respective relative layout specifications. As explained above, the relative layout specification may correspond to a data structure that reflects any one of a wide variety of different floor plan models. The following embodiments are described in the context of a relative layout specification that corresponds to a binary space partitioning model in accordance with which the relative positions of the graphic objects are recorded in a binary tree structure.

2. Generating a Final Arrangement of Graphic Objects on a Page

In some embodiments, the page layout generator module 64 receives a respective tree structure that describes relative positions of the graphic objects on a page. Each leaf node of a tree structure has an aspect ratio value (a) and, in the case of a strict-area style layout, a nominal size value (e). Each interior node of a tree structure indicates either a horizontal or vertical division on the page. The page layout generator module 64 determines areas of the graphic objects on each page and then allocates a precise region of page space to each node of the tree structure. The allocated regions of the page are nested in the same way as the corresponding tree structure. The allocated regions are referred to herein as "cells". In some implementations, once a cell is known, the position of a graphic object assigned to the cell is determined by centering the graphic object in the cell.

a. Determining Graphic Object Areas

The areas of the graphic objects are determined by either a bounding-box-based area determination method, a path-based area determination method, or a linear-system-based area determination method, depending on the desired accuracy, the desired layout style and the available computing resources.

i. Bounding-Box-Based Determination of Graphic Object Areas

In the illustrated embodiments, the objective of the bounding box determination process is to compute an aspect ratio value and nominal size value for each interior node in a given tree structure. Each bounding box is determined by the boxes it encloses.

Figure 16:
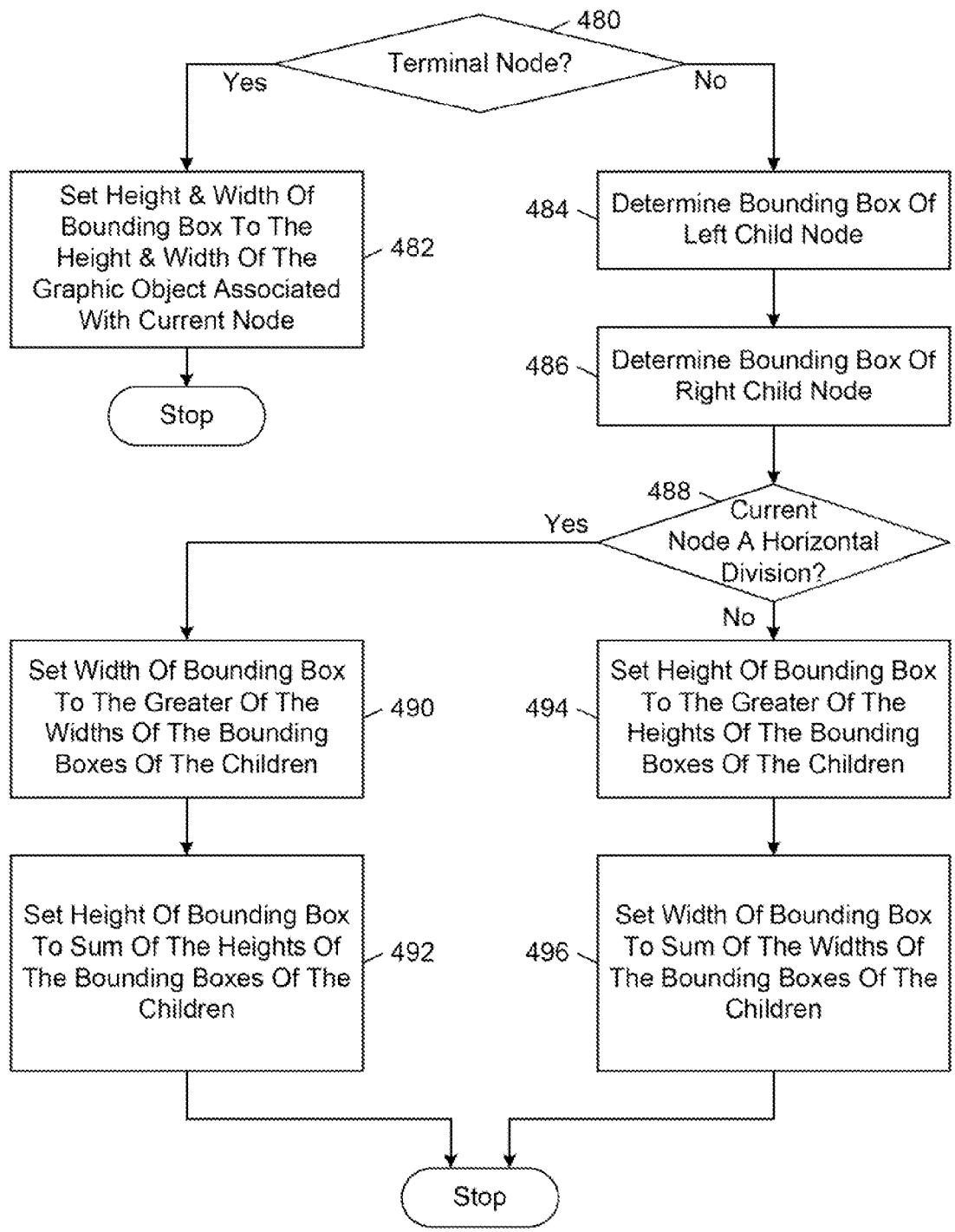
FIG. 16 is a flow diagram of an embodiment of a method of characterizing a bounding box of a node of a tree structure.

As will be described in greater detail below, the bounding boxes are computed using the aspect ratios and nominal sizes of the graphic objects. For strict area style layout, the nominal size for each graphic object can be set to equal the area of the corresponding rectangle in the floor plan specification. In some implementations, the bounding box characterization process begins at the leaf nodes and works toward the root node, in the order of a depth-first search, as illustrated in FIG. 16.

The formulas for the aspect ratio and nominal size of any interior node are given below. In general, for any image bounding box with an aspect ratio a, and a nominal size, e, the quantities $\sqrt{ae}$ and $\sqrt{e/a}$ are the nominal height and nominal width of the image bounding box, respectively. The aspect ratio, a, and the nominal size, e, for any interior node are functions of the aspect ratios and nominal sizes of its two children. In the following equations, $a_r$ and $e_r$ are the aspect ratio and nominal size of the right-hand child node, and $a_l$ and $e_l$ are the aspect ratio and nominal size of the left-hand child node. Thus, if the right-hand and left-hand child nodes are arranged side-by-side, the aspect ratio and nominal size of the bounding box that encloses them are:

$$a = \frac{\sqrt{a'e'}}{\sqrt{e_l/a_l} + \sqrt{e_r/a_r}} \quad (1)$$

$$e = \sqrt{a'e'}\left(\sqrt{e_l/a_l} + \sqrt{e_r/a_r}\right) \quad (2)$$

where $$\sqrt{a'e'} = \max_{i \in \{r,l\}}\left(\sqrt{a_i e_i}\right) \quad (3)$$

The aspect ratio in equation (1) is the ratio of the greater nominal height divided by the sum of the two nominal widths, and the nominal size in equation (2) is the product of the greater nominal height and the sum of the two nominal widths. Finding the maximum in equation (3) determines which of the two child node boxes is nominally taller, and therefore governs the height of the parent node box.

If the two child nodes represent boxes that are arranged one on top of the other, the aspect ratio and nominal size of the bounding box that encloses them are:

$$a = \frac{\sqrt{a_l e_l} + \sqrt{a_r e_r}}{\sqrt{e'/a'}} \quad (4)$$

$$e = \left(\sqrt{a_l e_l} + \sqrt{a_r e_r}\right)\sqrt{e'/a'} \quad (5)$$

where $$\sqrt{e'/a'} = \max_{i \in \{r,l\}}\left(\sqrt{e_i/a_i}\right) \quad (6)$$

In this case, equation (6) determines which of the two child node boxes is nominally wider, and therefore governs the width of the parent node box.

The bounding box of the root node conveys the shape and nominal size of the entire layout of the page specified by the corresponding tree structure. The bounding box of the root node is referred to herein as the "principal bounding box".

When the aspect ratio and nominal size of the principal bounding box are known, the bounding-box based area $A_i$ for graphic object i is computed as $$A_i = \frac{e_i}{e_{pbb}} A_{pbb} \quad (7)$$

where $e_i$ and $e_{pbb}$ are the nominal sizes of graphic object i and the principal bounding box respectively, and where $A_{pbb}$ is an area for the principal bounding box, computed as $$A_{pbb} = A_{page} \frac{\min\{a_{pbb}, a_{page}\}}{\max\{a_{pbb}, a_{page}\}} \quad (8)$$

where $A_{page}$ is the area of the usable page space.

FIG. 16 shows a flow diagram of an embodiment of a recursive process by which the page layout generator module 64 calculates relative height and width dimensions of the bounding boxes for the nodes of a tree structure.

The process begins with the root node as the current node. A decision is made whether the current node is a terminal node (FIG. 16, block 480). If the current node is a terminal node, a bounding box is established that has the nominal height and width of the associated graphic object (FIG. 16, block 482). If the current node is not a terminal node, the two child nodes of the current node (i.e., the left child node and the right child node) are submitted to the same recursive process (FIG. 16, blocks 484, 486). The bounding boxes of the two children are combined to form the bounding box for the current node as follows. The page layout generator module 64 determines if the current node is a horizontal division or a vertical division (FIG. 16, block 488). If current node represents a horizontal division, then the nominal width of the bounding box is set to the nominal width of the wider of the bounding boxes of the two children (FIG. 16, block 490) and the nominal height of the bounding box is set to the sum of the nominal heights of the bounding boxes of the two children. If the current node represents a vertical division (FIG. 16, block 488), the nominal height of the bounding box is set to the nominal height of the taller of the bounding boxes of the two children (FIG. 16, block 494) and the nominal width of the bounding box is set to the sum of the nominal widths of the bounding boxes of the two children. This process continues until the bounding box for the root node has been computed.

ii. Path-Based Determination of Graphic Object Areas

In accordance with the path-based area determination method, the page layout generator module 64 generates paths PI through the tree structures in accordance with the path generation process described below in connection with FIGS. 9-10J and block 410 of FIG. 24, in U.S. patent application Ser. No. 11/769,671, which was filed Jun. 27, 2007.

The page layout generator module 64 calculates a path length $L(P_l)$ for each path $P_l$. If path $P_l$ is vertical, then its length is $$L(P_1) = \text{sum (fixed distances through divisions along } P_1) + \quad (9)$$
$$\text{sum (heights of fixed-area graphic objects on } P_1) +$$
$$\text{sum (heights of variable-area graphic objects on } P_1)$$

The height ($H_{GO}$) of a graphic object can be written as follows:

$$H_{GO} = \sqrt{a \cdot A} = \sqrt{a} \cdot \sqrt{A} = Q \cdot \sqrt{a} \quad (10)$$

where A is the area of the graphic object, a is the aspect ratio defined as the ratio of the height divided by the width, and Q is the square root of the area. Therefore, if $P_l$ is a vertical path, its length can be written $$L(P_1) = K_1 + \sum_{j \in G_i} Q_{i,j} \cdot \sqrt{a_{i,j}} \quad (11)$$

where $K_l$ is the sum of the first two terms in equation (9) (i.e., all the fixed distances along path $P_l$); $Q_{l,j}$ is the square root of the area of the j-th variable area object on path $P_l$; and $a_{l,j}$ is the aspect ratio of the j-th variable area object on path $P_l$. Note that the summation term corresponds to the sum of the heights of variable area graphic objects on path $P_l$.

From a similar derivation, the length of horizontal path $P_l$ can be written $$L(P_1) = K_1 + \sum_{j \in G_i} \frac{Q_{i,j}}{\sqrt{a_{i,j}}} \quad (12)$$

where $K_l$ is a sum of horizontal fixed distances and widths of fixed-area graphic objects along path $P_l$. In strict area style layout, each variable-area graphic assembly has an assigned nominal size, which is denoted by the variable e. In the context of a multi-element graphic object, which has more than one constituent single-element graphic object (such as a series of keyframes from a video), a single aggregate nominal size is assigned to the entire graphic object and the nominal sizes of the individual graphic objects in the multi-element graphic object are set to equal the aggregate nominal size divided by the number of graphic objects in the graphic object. In the remainder of this section it is assumed that each graphic object j on a path $P_l$ is a single-element graphic object that has a positive nominal size $e_j$. Since a nominal size is proportional to the actual area, the variable Q, which is defined above, can be generalized to reflect the square root of a nominal size (rather than an absolute area) as follows:

$$Q = g \cdot \sqrt{e} \quad (13)$$

where g is a positive scalar such that $g^2$ multiplied by the nominal size is an absolute measurable area (e.g., square inches). The ratio of Q divided by $\sqrt{e}$ is a constant across all variable-area graphic objects, so that the same value of g is used for all variable-area graphic objects on the page. Thus, in equations (11) and (12) above, when substituting $g \cdot \sqrt{e}$ for Q, g can be pulled out of the summation terms to arrive at:

$$L(P_1) = K_1 + g \cdot \sum_{j \in G_i} \sqrt{e_{i,j}} \cdot \sqrt{a_{i,j}} \quad (14)$$

$$L(P_1) = K_1 + g \cdot \sum_{j \in G_i} \frac{\sqrt{e_{i,j}}}{a_{i,j}} \quad (15)$$

where $e_{l,j}$ is the nominal size of the $j^{th}$ variable-area graphic object on path $P_l$.

If path $P_l$ is a vertical path and the available area on the page has height $H_{PAGE}$, then solving the following equation for $g_l$ yields the value for which $P_l$ is exactly as long as the available area is high:

$$H_{PAGE} = K_1 + g_i \cdot \sum_{j \in G_i} \sqrt{e_{i,j}} \cdot \sqrt{a_{i,j}} \quad (16)$$

Similarly, if path $P_i$ is a horizontal path and the available area has width $W_{PAGE}$, then solving the following equation for $g_i$ yields the value for which the path fits exactly across the width of the available area:

$$W_{PAGE} = K_1 + g_1 \cdot \sum_{j \in G_1} \frac{\sqrt{e_{i,j}}}{a_{i,j}} \quad (17)$$

We assume that for each horizontal path embodied by the tree structure, $$W_{PAGE} > K_l;$$

and that for each vertical path embodied by the tree structure, $$H_{PAGE} > K_l.$$

This implies that the fixed distances along each path fit within their respective dimensions, so that in turn, the layout represented by the tree structure is "feasible:" there exist positive values for the areas of variable-area graphic objects such that all graphic objects fit on the page.

In one embodiment, areas for variable-area graphic objects are made as large as possible, while still allowing all the graphic objects to fall completely on the usable area of the page, by (for each path $P_l$) solving for g, using either equation (16) or (17), depending on whether $P_l$ is a vertical or horizontal path. Because the layout is assumed to be feasible, as described above, each solution for $g_l$ will be positive. If g* is defined to be the smallest solution across all the paths:

$$g^* = \min_l \{g_l\} \quad (18)$$

then the area $A_j$ of the $j^{th}$ variable-area graphic object is computed as $$A_j = (g^*)^2 \cdot e_j \quad (19)$$

where $e_j$ is the nominal size assigned to the $j^{th}$ variable-area graphic object.

iii. Linear-System-Based Determination of Graphic Object Areas

In brick style layouts, graphic element areas are determined by first computing values of Q. Once the values of Q are known, they can be squared to compute absolute, measurable areas (e.g., in units of square inches). Values of Q are computed for two hypothetical scenarios: (I) the height of the area occupied by graphic elements is constrained to equal the height of the usable area on the page; and (II) the width of the area occupied by graphic elements is constrained to equal the width of the usable area on the page. In most cases, only one of scenarios (I) and (II) will yield a feasible solution because in the other scenario, the other (unconstrained) dimension will be greater than the available space. The scenario yielding the feasible solution is selected to produce the final set of graphic element areas.

In either scenario (I) or (II), values of Q are computed as the solution to a linear system of equations having N unknowns, where N is the number of graphic elements. Each of N−1 of the equations comes from an interior node of the complete tree structure, because in a tree accommodating N graphic elements, there are exactly (N−1) interior nodes.

For an interior node that represents a vertical division or cut of the area, the corresponding equation is derived by first obtaining two vertical paths, one path from each of its two children, and setting their lengths to be equal. Referring to equation (11) above, denoting the vertical path from the left-hand child as $P_L$ and from the right-hand child as $P_R$, the corresponding expression is given by:

$$K_R + \sum_{j \in G_R} Q_{R,j} \cdot \sqrt{a_{R,j}} = K_L + \sum_{k \in G_L} Q_{L,k} \cdot \sqrt{a_{L,k}} \quad (20)$$

where the variable j indexes the graphic objects along $P_R$ and k indexes the graphic objects along $P_L$. Rearranging equation (20) yields $$\sum_{j \in G_R} Q_{R,j} \cdot \sqrt{a_{R,j}} - \sum_{k \in G_L} Q_{L,k} \cdot \sqrt{a_{L,k}} = K_L - K_R \quad (21)$$

The situation is analogous for an interior node that represents a horizontal division or cut of the area. Two horizontal paths are obtained, and their lengths set to be equal, yielding $$\sum_{j \in G_R} \frac{Q_{R,j}}{\sqrt{a_{R,j}}} - \sum_{k \in G_L} \frac{Q_{L,k}}{\sqrt{a_{L,k}}} = K_L - K_R \quad (22)$$

By constructing an equation of the form of either (21) or (22) for each interior node, N−1 equations are obtained for N unknowns.

For scenario I, the $N^{th}$ equation is obtained by setting the length of any vertical path from the root node equal the height of the available area. For scenario II, the $N^{th}$ equation is obtained by setting the length of any horizontal path from the root node equal the width of the available area.

For both scenarios I and II, the N equations are written in matrix-vector form (Ax=b). The matrix contains only zeros, positive and negative square roots of graphic element aspect ratios, and positive and negative inverses of square roots of graphic element aspect ratios. The N elements of vector x are the Q variables. Among the N elements of vector b, (N−1) are computed as the right-hand side of either equation (20) or equation (21), and the other is equal to the height (scenario I) or width (scenario II) of the available area (minus the fixed distance along the path used to obtain the corresponding row). Computing inverse(A)*b yields the vector of Q values.

b. Determining Bounding Boxes Around the Nodes in the Tree Structure

After absolute areas are computed, bounding boxes are characterized around each node in the tree structure. The actual steps required to accomplish this process are perfectly analogous to the process for computing bounding boxes described above in connection with bounding-box-based area determination, as shown in FIG. 16, with two exceptions. First, the nominal sizes happen to be actual graphic object areas. Second, the spacing assigned to interior nodes is not ignored, but rather added to the sums in the computations of blocks 492 and 496.

c. Allocating Page Space to Graphic Objects i. Overview of Page Space Allocation Process In some embodiments, the process of allocating regions of page space to nodes involves dividing a page into cells and positioning each graphic object in its respective cell. The page is divided into cells by splitting the page into rectangles, starting with the entire usable area of the page as the first rectangle. Each split is accomplished by drawing a line segment for a respective one of the interior nodes, starting at the root node in order of a breadth-first search.

In the case of an interior node corresponding to a vertical division, the page layout generator module 64 selects a horizontal position x along the width of the available region. In one formulation, $x \in (0,1)$, where x=0 represents the leftmost position and x=1 represents the rightmost position in the available region. In this case, $$x = \frac{\sqrt{e_l/a_l}}{\sqrt{e_l/a_l} + \sqrt{e_r/a_r}} \qquad (23)$$

where $a_l$, $e_l$, and $a_r$, $e_r$ are the aspect ratios and areas of the bounding boxes for the left and right children of the interior node. This formulation makes direct use of widths as proportions. The analogous formula for a horizontal division uses the heights. That is, if the vertical position along the height of the available space is denoted $y \in (0,1)$, where y=0 represents the bottom position and y=1 represents the top position:

$$x = \frac{\sqrt{e_b a_b}}{\sqrt{e_b a_b} + \sqrt{e_t a_t}} \qquad (24)$$

where $a_b$, $e_b$, and $a_t$, $e_t$ are the aspect ratios and areas of the bounding boxes for the bottom and top children of the interior node.

ii. Detailed Process of Allocating Page Space to Graphic Objects

Figure 17:
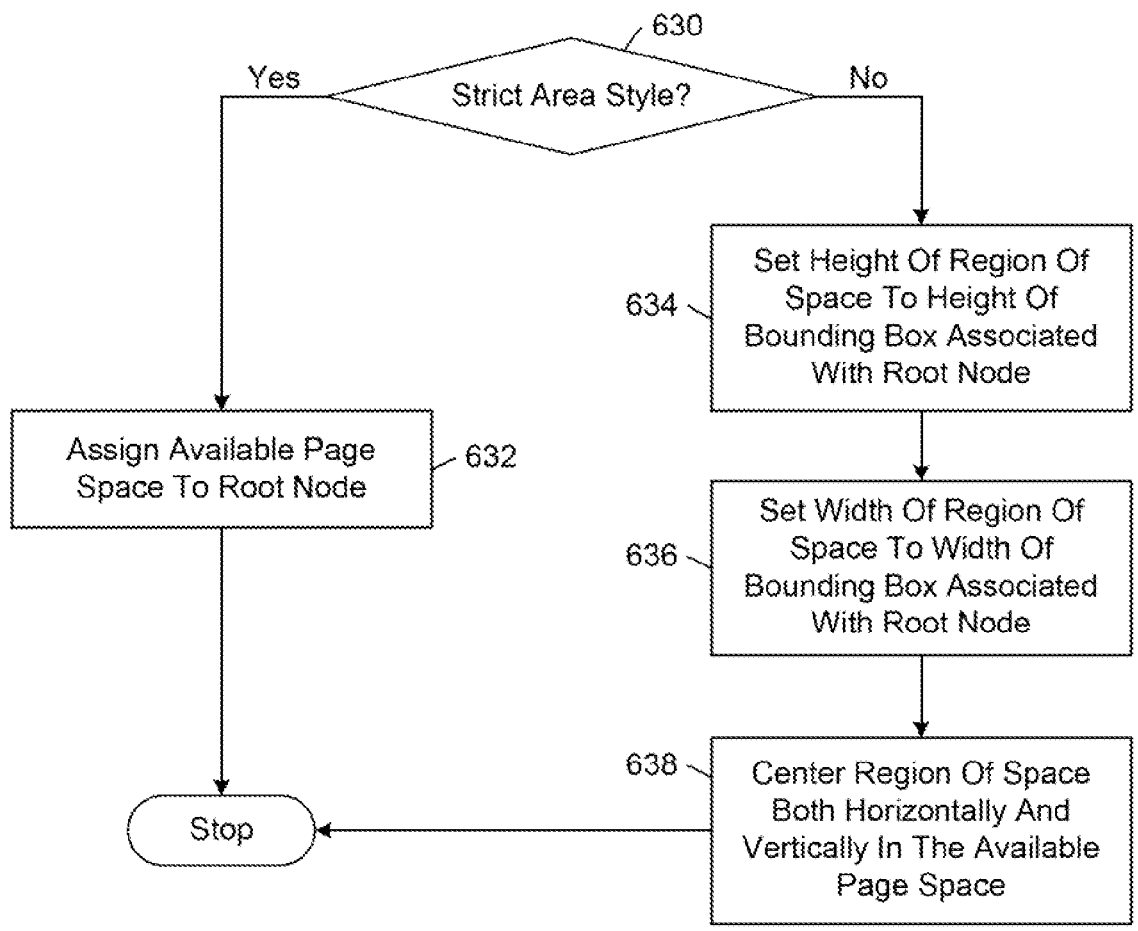
FIG. 17 is a flow diagram of an embodiment of a method of assigning a region of page space to a root node of a tree structure.

FIG. 17 shows an embodiment of a method of allocating a physical region of space on a page to the root node of the current tree structure. In accordance with this method, the layout style is determined (FIG. 17, block 630). For a strict area style layout, the entire usable area of the page is assigned to the root node (FIG. 17, block 632). For brick style layout, the page space assigned to the root node has the height and width of the bounding box associated with the root node (FIG. 17, blocks 634, 636). The region assigned to the root node then is centered in the available page space (FIG. 17, block 638).

Figure 18:
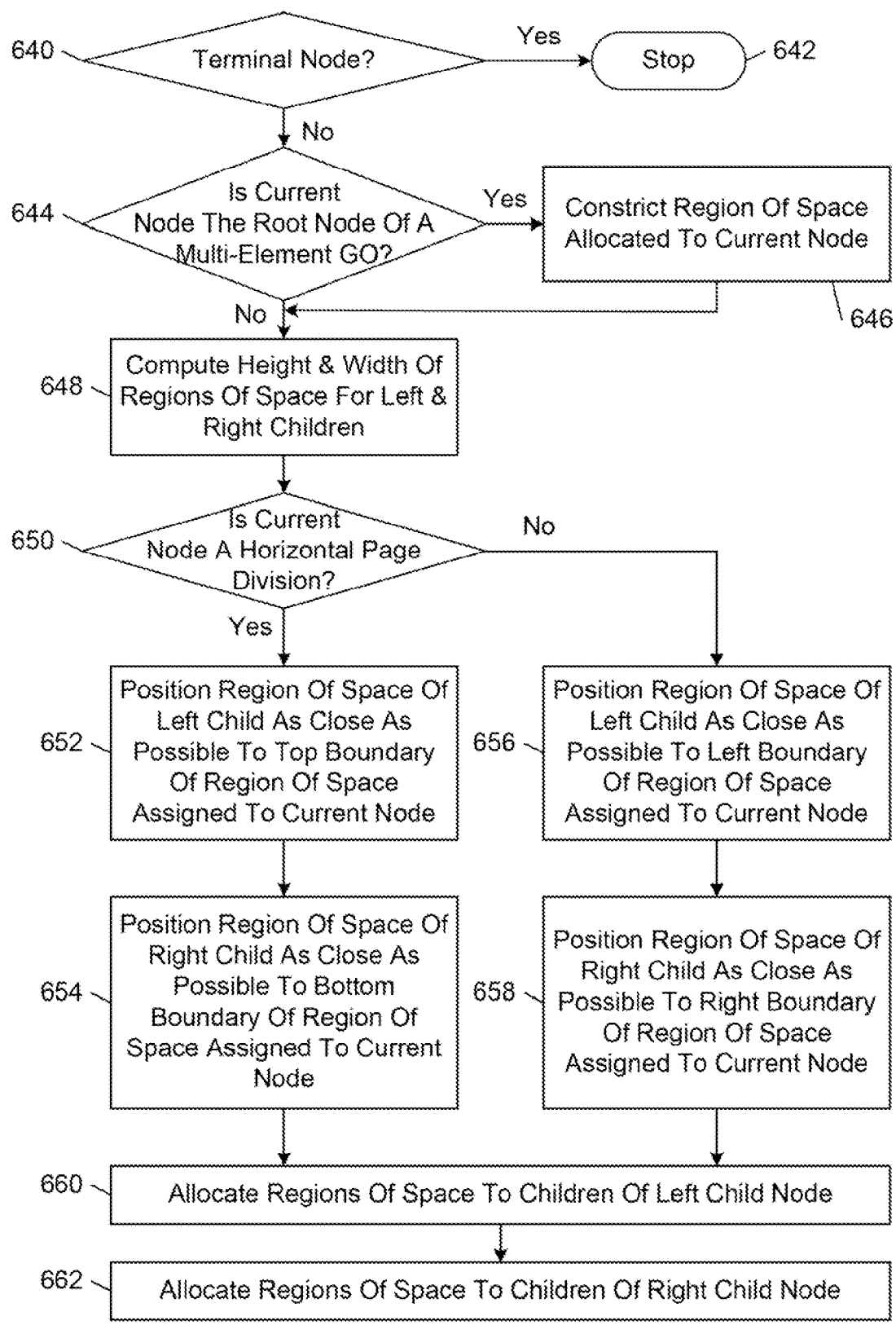
FIG. 18 is a flow diagram of an embodiment of a method of allocating regions of page space to children of a node of a tree structure.

FIG. 18 shows an embodiment of a method of allocating regions of page space to children of a node of a tree structure. In this process, the region of space assigned to each interior node is divided between its two direct children. The division is accomplished by setting the root node of the current tree structure to the current node and implementing a recursive process.

In the recursive process, a decision is made whether the current node is a terminal node (FIG. 18, block 640). If the current node is terminal node (i.e., a leaf node) the process ends (FIG. 18, block 642). If the current node is an interior node, a determination is made whether the current node is the root node of a tree corresponding to a multi-element graphic object (GO) having more than one single-element graphic object (FIG. 18, block 644). If this is the case, then the region assigned to the current node is constricted (FIG. 18, block 646) by reassigning the height and width of the region to be the height and width of the bounding box previously computed for the current node, and the position of the region is centered in the region previously assigned to the current node. In brick style layout this has no effect. In strict area style layout, this has the effect of pulling together the images in a graphic assembly having more than one graphic element (such as a series of keyframes).

If it is determined that the current node is not the root node of a tree corresponding to a multi-element graphic object (FIG. 18, block 644), the height and width of the regions of space for left children and right children of the current node are computed (FIG. 18, block 648).

If the current node is a horizontal page division, the heights ($H_R$, $H_L$) of the regions assigned to the right child and the left is given by:

$$H_R = R \cdot \frac{H_{NODE} - S}{L + R} \qquad (25)$$

$$H_L = L \cdot \frac{H_{NODE} - S}{L + R} \qquad (26)$$

where $H_{NODE}$ is the height of the current node region of space, S is the node spacing, L is the height of the left child node bounding box, and R is the height of the right child bounding box. The width of the regions assigned to the left and right children are set equal to the width of the region assigned to the current node.

If the current node is a vertical page division, the widths ($W_R$, $W_L$) of the regions assigned to the right child and the left is given by:

$$W_R = R \cdot \frac{W_{NODE} - S}{L + R} \qquad (27)$$

$$W_L = L \cdot \frac{W_{NODE} - S}{L + R} \qquad (28)$$

where $W_{NODE}$ is the width of the current node region of space. The height of the regions assigned to the left and right children are set equal to the height of the region assigned to the current node.

If the current node is a horizontal page division (FIG. 18, block 650), the region of space of the left child is positioned as close as possible to the top boundary of the region of space assigned to the current node (FIG. 18, block 652). The region of space of the right child is positioned as close as possible to the bottom boundary of the region of space assigned to the current node (FIG. 18, block 654).

If the current node is a vertical division (FIG. 18, block 650), the region of space of the left child is positioned as close as possible to the left boundary of the region of space assigned to the current node (FIG. 18, block 656). The region of space of the right child is positioned as close as possible to the right boundary of the region of space assigned to the current node (FIG. 18, block 658).

The process described above is repeated to allocate regions of space to children of the left child node (FIG. 18, block 660) and to children of the right child node (FIG. 18, block 662). The process is repeated iteratively until regions of page space are assigned to all children (direct or otherwise) of the current node.

3. Outputting a Final Layout of Graphic Objects

The page layout generator module 64 typically outputs the final layout in the form of a specification that includes a data structure (e.g., a table or a list) that describes the final page layout. In some embodiments, the specification is stored on a machine-readable medium in an XML (eXtensible Markup Language) file format. Storage devices suitable for tangibly embodying specification include all forms of non-volatile computer-readable media and volatile computer-readable media, including but not limited to, for example, semiconductor memory devices, such as EPROM, EEPROM, and flash memory devices, magnetic disks such as internal hard disks and removable disks, magneto-optical disks, and CD-ROMs. The final layout specification may be used by the user interface module 66 or a print module to render the final layout on a display or a print medium (e.g., paper).

IV. EXEMPLARY ARCHITECTURES OF THE GRAPHIC OBJECT ARRANGEMENT SYSTEM

Embodiments of the graphic object arrangement system 60 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the graphic object arrangement system 60, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the graphic object arrangement system 60 may be implemented in any one of a wide variety of electronic devices, including desktop and workstation computers, video recording devices (e.g., VCRs and DVRs), cable or satellite set-top boxes capable of decoding and playing paid video programming, and digital camera devices. Due to its efficient use of processing and memory resources, some embodiments of the graphic object arrangement system 60 may be implemented with relatively small and inexpensive components that have modest processing power and modest memory capacity. As a result, these embodiments are highly suitable for incorporation in compact camera environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

Figure 19:
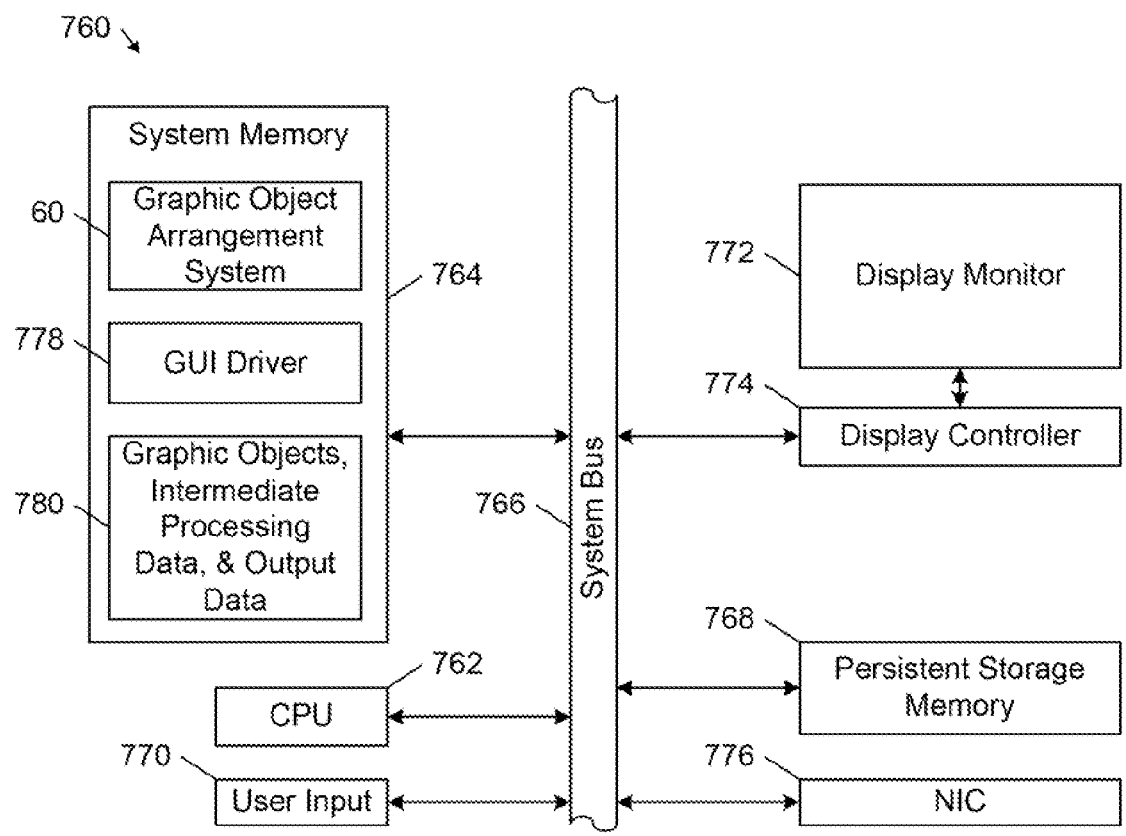
FIG. 19 is a block diagram of an embodiment of an apparatus incorporating an embodiment of the graphic object arrangement system of FIG. 4.

FIG. 19 shows an embodiment of a computer system 760 that incorporates any of the embodiments of the graphic object arrangement system 760 described herein. The computer system 60 includes a processing unit 762 (CPU), a system memory 764, and a system bus 66 that couples processing unit 762 to the various components of the computer system 760. The processing unit 762 typically includes one or more processors, each of which may be in the form of any one of various commercially available processors. The system memory 764 typically includes a read only memory (ROM) that stores a basic input/output system (BIOS) that contains start-up routines for the computer system 760 and a random access memory (RAM). The system bus 766 may be a memory bus, a peripheral bus or a local bus, and may be compatible with any of a variety of bus protocols, including PCI, VESA, Microchannel, ISA, and EISA. The computer system 760 also includes a persistent storage memory 768 (e.g., a hard drive, a floppy drive, a CD ROM drive, magnetic tape drives, flash memory devices, and digital video disks) that is connected to the system bus 766 and contains one or more computer-readable media disks that provide non-volatile or persistent storage for data, data structures and computer-executable instructions.

A user may interact (e.g., enter commands or data) with the computer 760 using one or more input devices 770 (e.g., a keyboard, a computer mouse, a microphone, joystick, and touch pad). Information may be presented through a graphical user interface (GUI) that is displayed to the user on a display monitor 772, which is controlled by a display controller 774. The computer system 760 also typically includes peripheral output devices, such as speakers and a printer. One or more remote computers may be connected to the computer system 760 through a network interface card (NIC) 776.

As shown in FIG. 12, the system memory 764 also stores the graphic object arrangement system 760, a GUI driver 778, and a database 780 containing graphic object files corresponding to the graphic objects 62, intermediate processing data, and output data. In some embodiments, the graphic object arrangement system 760 interfaces with the GUI driver 778 and the user input 770 to control the creation of the user-specified layouts of graphic objects and the final layouts of graphic objects. In some embodiments, the computer system 760 additionally includes a graphics application program that is configured to render image data on the display monitor 772 and to perform various image processing operations on the user-specified graphic object layouts and on the graphic objects themselves.

V. CONCLUSION

The embodiments that are described in detail herein provide ways to arrange graphic objects on one or more pages. These embodiments are capable of being guided or controlled by explicit preferences for the relative positions of the graphic objects in each layout (or arrangement). At the same time, these embodiments are capable of automatically generating from these preferences a final layout of the graphic objects that conforms to specified design constraints (e.g., page dimensions, margins, and gutter spacing constraints). In this way, users are able to guide these embodiments to a particular layout of the graphic objects that meets the general graphic object arrangement preferences of the user, while presenting a cleaner, more professional and more aesthetically pleasing appearance.

Other embodiments are within the scope of the claims.

What is claimed is:

1. A method performed by a computer, comprising a processor and a memory, the method comprising:
    deriving a relative layout specification from the user-specified layout, wherein the relative layout specification describes relative positions of the graphic objects, the deriving comprises ascertaining divisions between the graphic objects in the user-specified layout, and the ascertaining comprises determining horizontal and vertical histogram profiles of the user-specified layout and determining partitions that separate the graphic objects from each other;

determining a final layout of the graphic objects in accordance with the relative layout specification, wherein the final layout comprises a specification of size dimensions and positions of the graphic objects on a page; and outputting the final layout of graphic objects.

2. The method of claim 1, wherein the receiving comprises receiving from the user a mapping of the graphic objects to respective locations on a page.

3. The method of claim 1, wherein the receiving comprises receiving from the user commands constructing the user-specified layout in a graphical user interface.

4. The method of claim 1, wherein the receiving comprises receiving from the user: an image of a layout of representations of the graphic objects on a page; and a mapping between the representations and respective ones of the graphic objects.

5. The method of claim 1, wherein the ascertaining comprises generating a binary tree structure having leaf nodes representing ones of the graphic objects and interior nodes representing respective ones of the partitions.

6. The method of claim 1, wherein the determining comprises calculating the size dimensions of the graphic objects in accordance with the relative layout specification.

7. The method of claim 6, wherein the determining comprises generating a specification of the positions of the graphic objects on the page in accordance with the relative layout specification based at least in part on the calculated size dimensions.

8. The method of claim 1, wherein the outputting comprises outputting a specification of the final layout.

9. A computer-readable memory for arranging graphic objects on a page, the computer-readable memory storing computer-readable instructions, which when executed by a computer causes the computer to perform operations comprising:

receiving a user-specified layout of graphic objects;

deriving a relative layout specification from the user-specified layout, wherein the relative layout specification describes relative positions of the graphic objects, the deriving comprises ascertaining divisions between the graphic objects in the user-specified layout, and the ascertaining comprises determining horizontal and vertical histogram profiles of the user-specified layout and determining partitions that separate the graphic objects from each other;

determining a final layout of the graphic objects in accordance with the relative layout specification, wherein the final layout comprises a specification of size dimensions and positions of the graphic objects on a page; and outputting the final layout of graphic objects.

10. The computer-readable medium of claim 9, wherein the computer-readable instructions cause the computer to perform operations comprising receiving from the user a mapping of the graphic objects to respective locations on a page.

11. The computer-readable medium of claim 9, wherein the computer-readable instructions cause the computer to perform operations comprising receiving from the user commands constructing the user-specified layout in a graphical user interface.

12. The computer-readable medium of claim 9, wherein the computer-readable instructions cause the computer to perform operations comprising generating a binary tree structure having leaf nodes representing ones of the graphic objects and interior nodes representing respective ones of the partitions.

13. The computer-readable medium of claim 9, wherein the computer-readable instructions cause the computer to perform operations comprising calculating the size dimensions of the graphic objects in accordance with the relative layout specification.

14. The computer-readable medium of claim 13, wherein the computer-readable instructions cause the computer to perform operations comprising generating a specification of the positions of the graphic objects on the page in accordance with the relative layout specification based at least in part on the calculated size dimensions.

15. An apparatus, comprising:

a computer-readable memory;

a processing apparatus unit operable to perform operations comprising receiving a user-specified layout of graphic objects, deriving a relative layout specification from the user-specified layout, wherein the relative layout specification describes relative positions of the graphic objects, the deriving comprises ascertaining divisions between the graphic objects in the user-specified layout, and the ascertaining comprises determining horizontal and vertical histogram profiles of the user-specified layout and determining partition that separate the graphic objects from each other;

determining a final layout of the graphic objects in accordance with the relative layout specification, wherein the final layout comprises a specification of size dimensions and positions of the graphic objects on a page; and outputting the final layout of graphic objects.

16. An apparatus, comprising:

means for receiving a user-specified layout of graphic objects;

means for deriving a relative layout specification from the user-specified layout, wherein the relative layout specification describes relative positions of the graphic objects, the means for deriving operations comprising ascertaining divisions between the graphic objects the user-specified layout, and in the ascertaining the means for deriving performs operations comprising determining horizontal and vertical histogram profiles of the use-specified layout and determining partitions that separate the graphic objects from each other;

means for determining a final layout of the graphic objects in accordance with the relative layout specification, wherein the final layout comprises a specification of size dimensions and positions of the graphic objects on a page; and means for outputting the final layout of graphic objects.

* * * * *

UNITED STATES PATENT AND TRADEMARK OFFICE
CERTIFICATE OF CORRECTION

PATENT NO.         : 8,862,986 B2                     Page 1 of 1
APPLICATION NO.    : 11/865112
DATED              : October 14, 2014
INVENTOR(S)        : C. Brian Atkins et al.

It is certified that error appears in the above-identified patent and that said Letters Patent is hereby corrected as shown below:

In the Claims:

In column 20, line 58, in Claim 1, after "comprising:"
insert -- receiving a user-specified layout of graphic objects; --.

In column 21, line 32, in Claim 9, delete "instructions," and insert -- instructions --, therefor.

In column 22, line 30, in Claim 15, delete "partition" and insert -- partitions --, therefor.

In column 22, line 45, in Claim 16, after "deriving" insert -- performs --.

In column 22, line 46, in Claim 16, after "objects" insert -- in --.

In column 22, line 49, in Claim 16, delete "use-" and insert -- user- --, therefor.

Signed and Sealed this
Seventeenth Day of March, 2015

Michelle K. Lee
*Director of the United States Patent and Trademark Office*